United States Patent [19]
Rowland et al.

[11] Patent Number: 5,944,183
[45] Date of Patent: Aug. 31, 1999

[54] CARTON WITH GLUED LINER INCORPORATING AN INTEGRAL CELL

[75] Inventors: Angela L. Rowland, Trappe, Pa.; Larry D. Fielder, Oxford, Ga.

[73] Assignee: Jefferson Smurfit Corporation, St. Louis, Mo.

[21] Appl. No.: 09/050,137

[22] Filed: Mar. 30, 1998

[51] Int. Cl.⁶ .......................... B65D 85/57; B65D 85/575
[52] U.S. Cl. ................... 206/313; 206/232; 206/308.1; 206/387.1; 229/120.18; 229/120.37
[58] Field of Search .................. 229/122.32, 122.33, 229/120.37, 120.38, 125.125, 125.19, 120.18; 206/387.1, 387.11, 308.1, 313, 232

[56] References Cited

U.S. PATENT DOCUMENTS

| | | | |
|---|---|---|---|
| 2,503,379 | 4/1950 | Davis | 229/125.19 X |
| 3,302,844 | 2/1967 | Henry | 229/125.125 X |
| 3,675,763 | 7/1972 | Sandel | 206/387.11 X |
| 3,682,297 | 8/1972 | Austin et al. | 206/387.11 X |
| 4,134,495 | 1/1979 | Friedman | 206/387.11 |
| 4,197,979 | 4/1980 | Dutcher . | |
| 4,429,826 | 2/1984 | Shedd | 279/122.32 X |
| 4,433,780 | 2/1984 | Ellis . | |
| 4,453,631 | 6/1984 | Mark | 206/313 |
| 4,793,477 | 12/1988 | Manning et al. . | |
| 5,219,090 | 6/1993 | Vollmann . | |
| 5,248,032 | 9/1993 | Sheu et al. | 206/308.1 |
| 5,333,728 | 8/1994 | O'Brien et al. | 206/232 |
| 5,361,898 | 11/1994 | Gottlieb . | |
| 5,513,752 | 5/1996 | Gottlieb . | |
| 5,655,656 | 8/1997 | Gottlieb | 206/308.1 |

*Primary Examiner*—Bryon P. Gehman
*Attorney, Agent, or Firm*—Paul M. Denk

[57] ABSTRACT

A carton has an outer box and a liner that is glued to an inner surface of the box during assembly. The outer box includes front and back panels joined by perpendicularly extending side panels, and top and bottom panel that define a chamber therebetween in which can be inserted manuals, literature, documentation or the like. The liner is disposed in the chamber of the box. The liner includes a front panel and a back panel joined by perpendicularly extending side panels. The front, back and side panels have dimensions substantially similar to those of the front, back and side panels of the box, respectively. The liner further including a plurality of cutouts in the front panel that define a retaining panel and sidewalls. Upon assembly of the carton, the cutouts allow the retaining panel to move inwardly into the chamber so that the sidewalls extend substantially perpendicularly between the front panel of the liner and the retaining panel. The retaining panel, sidewalls and box define a recess in which an object such as a computer disc, audio cassette, or video tape can be inserted. The cell is open along a top edge to allow the object to be easily inserted therein. The integral cell erects automatically when glue lines are properly applied on the liner and the carton is formed. Top and bottom flaps preferably are included in the liner to provide increased carton strength and rigidity.

16 Claims, 4 Drawing Sheets

CARTON WITH GLUED LINER INCORPORATING AN INTEGRAL CELL

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to storage containers or cartons, and, in particular, to a carton for containing items such as compact discs, computer diskettes, audio cassettes or video cartridges and accompanying instruction manuals or other printed materials.

Information storage devices such as compact discs, computer diskettes, audio or video cassettes or video game cartridges often are sold with accompanying literature or printed materials such as instruction manuals, warranty information, printed transcripts and the like. Cardboard boxes or cartons and molded plastic containers typically are used to transport, store and display such storage devices and literature. However, these containers often do not adequately protect the cassettes or discs during shipping and handling. Often the cassettes or discs can move freely inside packaging, increasing the risk of damage to the storage devices or the accompanying literature. Furthermore, the containers can have a thin or flimsy construction that does not sufficiently protect the cassette or disc and documentation during shipping and handling.

It is therefore desirable to provide an improved container for cassettes and discs that has a rugged construction and includes an integral cell or compartment for securely retaining the information storage device in a fixed location inside the container. Cartons known in the art that employ inserts to separately hold items such as cassettes or tapes generally include an outer box with a separately loaded corrugated insert that holds the items. However, such cartons are difficult to manufacture and assemble, thus increasing the costs of such cartons.

Accordingly, it is further desirable to develop a liner for such cartons that includes a cell for retaining these items, and is easily manufactured and assembled. Such a liner also must satisfy performance requirements such as crush resistance and compression strength. Preferably such liner also is preglued to provide significantly increased hand-pack co-packer speeds during carton assembly. The cell preferably allows for such items to be easily inserted for storage and removed for usage. Provision of such a cell would reduce overall packaging costs associated with inserting items stored in such cartons.

BRIEF SUMMARY OF THE INVENTION

Accordingly, one object of the present invention is to provide an improved carton or container with a glued liner incorporating an integral cell that can hold an information storage device such as a computer disc or diskette and accompanying printed materials.

Another object of this invention is to provide such a carton which is made of paperboard, E-flute, F-flute or paperboard composites.

Still another object of this invention is to provide such a carton that is easily assembled.

Yet another object of this invention is to provide such a carton in which the information storage device and the accompanying literature may be easily retrieved from, and inserted into the carton.

These and other objects will become apparent to those skilled in the art in light of the following disclosure and accompanying drawings.

In accordance with the invention, generally stated, a carton is provided that includes an outer box and a liner that is glued to an inner surface of the box during assembly of the carton. The outer box includes a front panel and a back panel joined by perpendicularly extending side panels, a bottom panel extending between the top, back and side panels to define a bottom of the box, and a top panel extending between the top, back and side panels to define a top of the box. The front, back, side, top and bottom panels define a chamber therebetween in which can be inserted manuals, literature, documentation or the like.

The liner is disposed in the chamber of the box. The liner includes a front panel and a back panel joined by perpendicularly extending side panels. The front, back and side panels have dimensions substantially similar to those of the front, back and side panels of the box, respectively. The liner further including one or more cells integrally formed in the front panel and extending inwardly into the chamber. The cell and the box defining a recess therebetween that is adapted to receive an object therein, such as a computer disc, audio cassette, or video tape. The cell is open along a top edge to allow the object to be easily inserted therein. The integral cell erects automatically when glue lines are properly applied on the liner and the carton is formed. Such a liner preferably is positioned and glued onto the outer box blank on special folding carton gluers. Top and bottom flaps preferably are included in the liner to provide increased carton strength and rigidity and provide product protection.

Another aspect of the present invention is of blank for a carton liner that is glued to a blank for an outer box. The liner blank includes a front panel, a back panel, and a first sidewall panel connected to the front panel and the back panel along opposite side edges thereof defined by substantially parallel vertical score lines. A first sidewall flap is connected to said front panel along a side edge thereof defined by a vertical score line. A second sidewall flap is connected to the back panel along a side edge thereof defined by a vertical score line. The first sidewall flap is sealed to the second side wall flap upon assembly of the carton to define a second sidewall panel. A top support panel further is provided that is connected to the back panel along a top edge thereof defined by a horizontal score line. A plurality of cutouts formed in the front panel and the first sidewall panel of the blank to define a retaining panel and a plurality of sidewalls. The cutouts permit inward movement of the retaining panel upon assembly of the carton so that the sidewalls extend substantially perpendicularly between the front panel and the retaining panel.

The blank for the outer box includes a front panel, a back panel, and a first sidewall panel connected to the front panel and the back panel along opposite side edges thereof defined by substantially parallel vertical score lines. The front panel of the liner is glued to the front panel of the outer box at predetermined locations. A second sidewall panel is connected to the front panel along a side edge thereof defined by a vertical score line. The blank further includes a glue flap or tab connected to the back panel along a side edge thereof defined by a vertical score line. The second sidewall panel is sealed to the glue flap upon assembly of the carton. A top panel is connected to the front panel along a top edge thereof defined by a horizontal score line. A bottom panel is connected to the back panel along a bottom edge thereof defined by a horizontal score line.

Other objects and features will be apparent and in part pointed out hereinafter.

BRIEF DESCRIPTION OF THE SEVERAL VIEWS OF THE DRAWINGS

The objects of the invention are achieved as set forth in the illustrative embodiments shown in the drawings which form a part of the specification.

In the drawings.

Corresponding reference characters indicate corresponding parts throughout the several views of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention.

Figure 1:
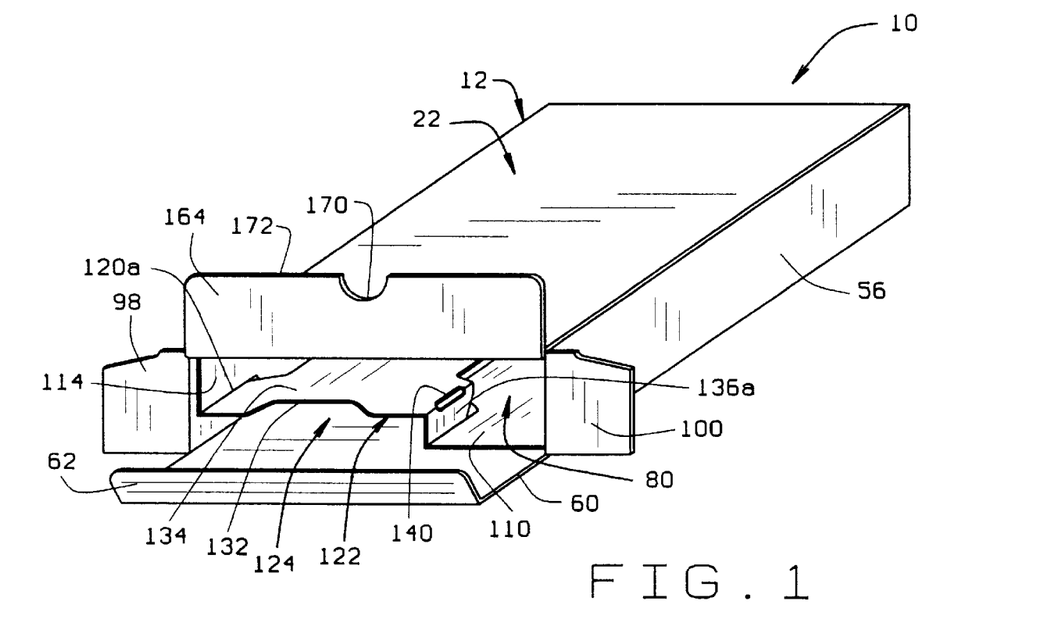
FIG. 1 is a perspective view of the carton of the present invention, showing the integrally formed cell of the liner.
Figure 1A:
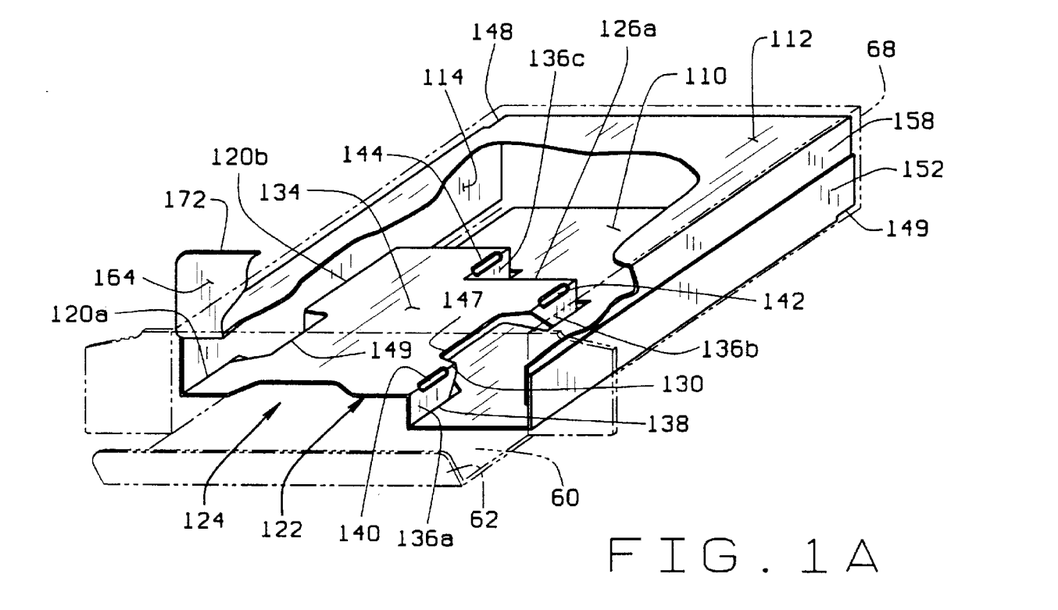
FIG. 1A is a perspective sectional view of the carton in FIG. 1, with the outer box shown in phantom and a portion of the liner removed to show the cell integrally formed in the liner.

Referring now to the drawings, and in particular FIGS. 1 and 1A, a container or carton is shown, referred to generally as reference numeral 10, for receiving and storing an information storage device (not shown) such as a computer diskette, compact disc, audio or video cassette, video game cartridge or the like, and accompanying printed literature or documentation (not shown). The carton 10 includes an outer box 12 and an inner liner 14 that is glued to the box 12. The box 12 and the liner 14 are formed from blanks 16 and 18, respectively. The blanks 16 and 18 preferably are constructed from paperboard, E-flute, F-flute or paperboard composites. As discussed below in greater detail, the liner 14 includes at least one integral cell 122 (FIGS. 1A and 2) that erects automatically when glue lines are properly applied on the liner 14 and the carton 10 is formed. The cell 122 and box 12 define a recess 124 in which the information storage device is inserted. Accompanying manuals, brochures, pamphlets or other literature can be inserted in a chamber 80 formed inside the box 14.

Figure 3:
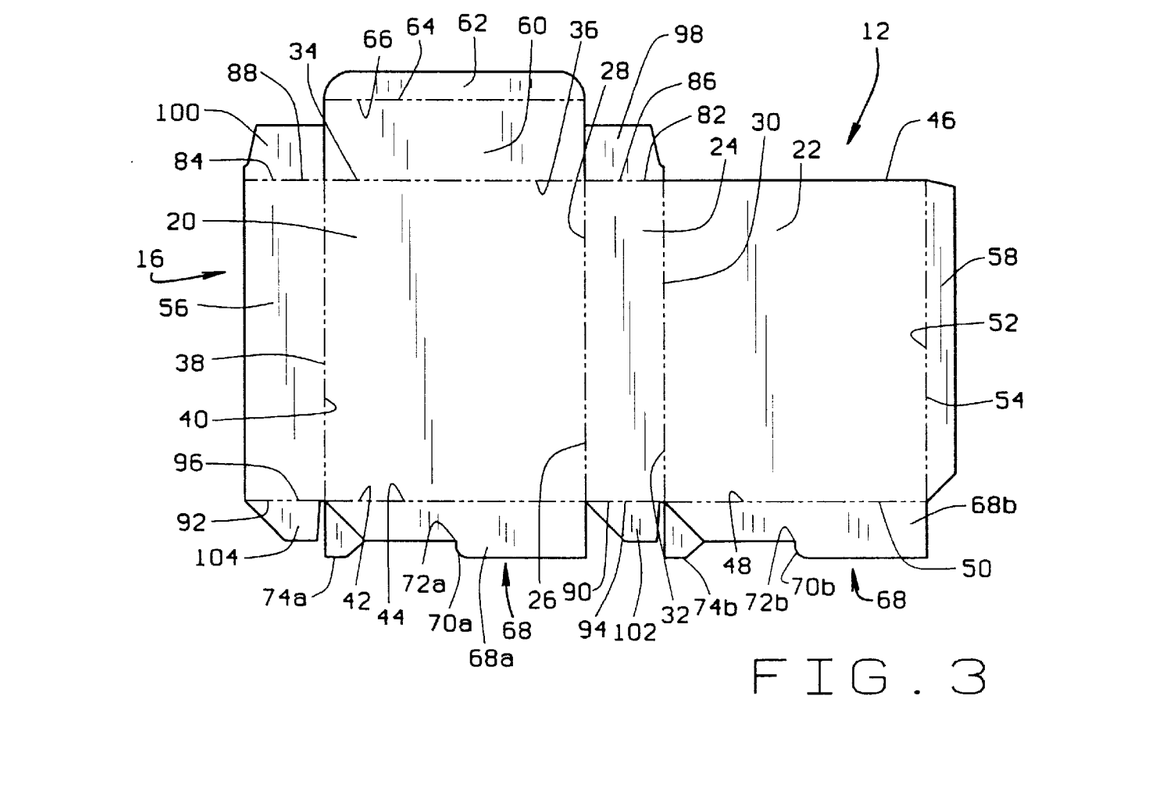
FIG. 3 is a plan view of a blank for a first embodiment of an outer box of the carton.
Figure 6:
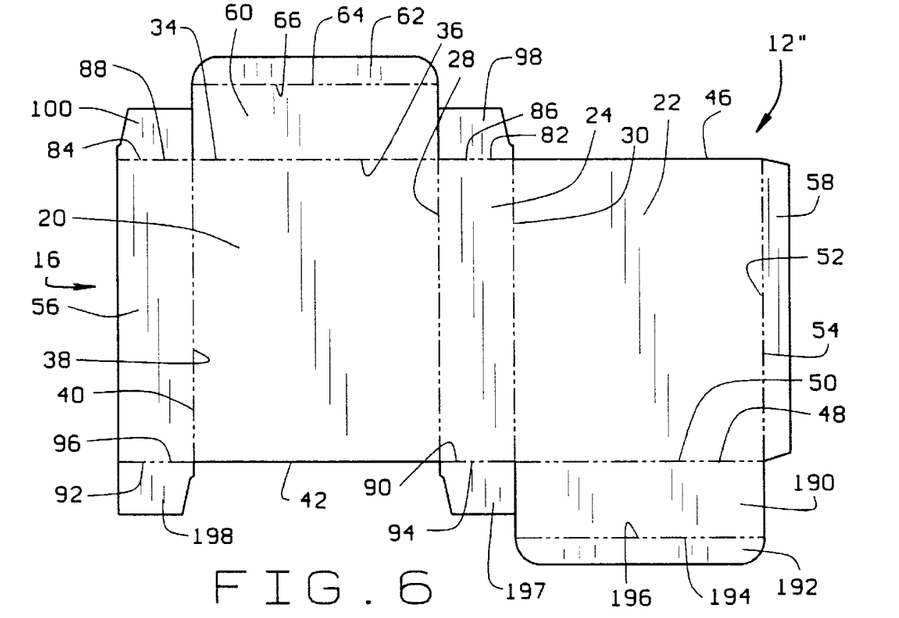
FIG. 6 is a plan view of a blank for a second embodiment of an outer box of the carton.

The box 12 preferably is cut from the blank 16 in one of two alternative embodiments shown in FIG. 3 and FIG. 6. In the first embodiment of FIG. 3, the box 12 has a first or front panel 20 and a second or back panel 22 joined by a sidewall panel 24. The sidewall 24 extends between a side edge 26 of the front panel 20 defined by a score line 28 and a side edge 30 of the back panel 22 defined by a score line 32 in the blank 16. The front panel 20 also includes a top edge 34 defined by a score line 36, a side edge 38 defined by a score line 40 and a bottom edge 42 defined by a score line 44 in the blank 16. Similarly, the back panel 22 includes a top edge 46, a bottom edge 48 defined by a score line 50, and a side edge 52 defined by a score line 54 in the blank 16.

A second sidewall panel 56 extends outwardly from the front panel 20 along side edge 38. The sidewall panel 56 is sealed to a glue flap 58 that extends along the side edge 52 of the back panel 22 upon assembly of the carton 10. A glue line (not shown) extends substantially the entire length of the glue flap 58 on the outer surface of the blank 16. The glue used for this glue line and the other glue lines discussed below preferably is a pressure activated adhesive, although other adhesives can be employed.

The box 12 further includes a top panel 60 that is joined to the front panel 20 along the top edge 34. A lip margin 62 extends outwardly from a folded edge 64 of the top panel 60 defined by a score line 66 as shown in FIG. 3. A bottom panel 68 of the box 12 is defined by two bottom flaps 68a and 68b, where bottom flap 68a is joined to the front panel 20 along the bottom edge 42, and bottom flap 68b is joined to the back panel 22 along the bottom edge 48, as shown in FIG. 3. Bottom flaps 68a and 68b have identical configurations, including a notch 70a and 70b that defines a seat 72a and 72b and a locking flap 74a and 74b, respectively. Upon assembly of the carton 10, bottom flap 68a is matingly engaged with bottom flap 68b so that the notch 70a is disposed in seat 72b and notch 70b is disposed in 72a. The locking flaps 74a, 74b prevent disengagement of the bottom flaps 68a, 68b.

The lip margin 62 is provided to hold the top panel 60 in position with respect to the front and back panels 20, 22 upon assembly of the carton 10. When the box 12 is assembled, the top, bottom, front, back and sidewall panels 60, 68, 20, 22, 24 and 56, respectively, define a substantially cubical parallelepiped shape with a chamber 80 defined therebetween (FIG. 1). Manuals, instruction books or other printed materials can be stored inside the chamber 80.

In the first embodiment of the box 12 as shown in FIG. 3, each sidewall panel 24, 56 also preferably has a top edge 82, 84 defined by score lines 86, 88 and a bottom edge 90, 92 defined by score lines 94 and 96, respectively. A top side flap 98, 100 and a bottom side flap 102, 104 are joined to each sidewall panel 24, 56 along the top edges 82, 84 and the bottom edges, 90,, 92 respectively. Upon assembly of the carton 10, the top side flaps 98, 100 are folded inwardly along score lines 86, 88 before the top panel 60 is folded over along score line 36. Similarly, the bottom side flaps 102, 104 are folded inwardly along score lines 94, 96 before the bottom flaps 68a, 68b are folded inwardly along score lines 44, 48, respectively. The top and bottom side flaps 98, 100, 102, 104 help prevent contents stored inside the carton 10 from escaping from the chamber 80.

Figure 4:
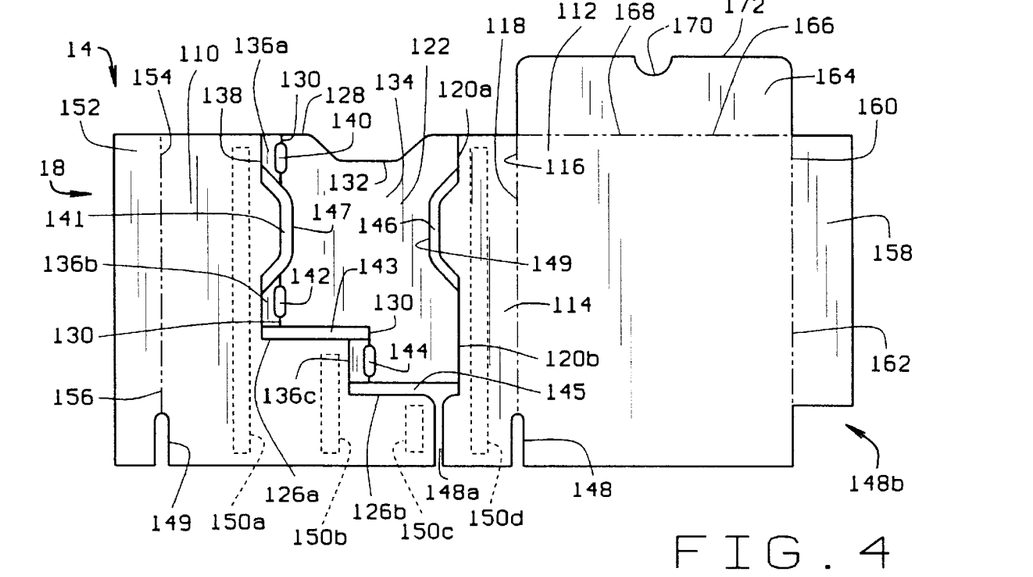
FIG. 4 is a plan view of a blank for a first embodiment of a liner that can be glued to an inner surface of the box shown in FIG. 3.

FIG. 4 illustrates one embodiment of the liner 14 that is glued to the inner surface of the box 12 of FIG. 3 prior to folding the box 12 along its score lines 28, 32, 36, 40, 44, 50, 54, 66, 86, 88, 94 and 96 and gluing the sidewall panel 56 to the side glue flap 58. The liner 14 preferably is positioned and glued onto the outer box 12 blank 16 on special folding carton gluers. The liner 14 includes a first or front panel 110 and a second or back panel 112 that are joined by a sidewall panel 114. The sidewall panel 114 extends between a side edge 116 of the back panel 112 defined by a score line 118 in the blank 18, and a folded edge 120 of a cell 122 integrally formed in the front panel 110 of the liner 14.

Figure 2:
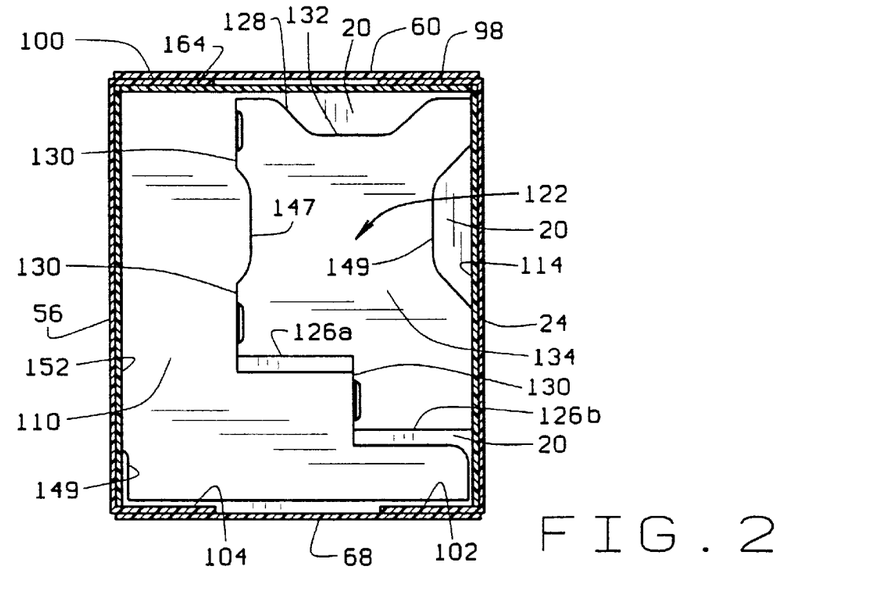
FIG. 2 is a rear elevational view of the carton, with the back panels of the outer box and liner removed to show the cell.

More specifically, the liner includes integral cell 122 that erects automatically when glue lines 150 are properly applied on the liner blank 18 and the carton 10 is formed. The cell 122 is formed in the front panel 110 so that it extends inwardly from the box 12 into the chamber 80 so as to define a recess 124 (FIG. 1) sized to receive an object or information storage device such as a computer disc, video game cartridge or the like. FIGS. 1A and 2 show the preferred configuration for the cell 122.

The cell 122 includes a retaining panel 134 and a plurality of side walls 136 extending between the front panel 110 and the retaining panel. Folded side edges 120a and 120b, bottom edges 126a, 126b and top edge 128, and side edge 130 define the periphery of the retaining panel 134. The cell 122 is open along its top edge 128, and sealed to the front panel of the box by glue lines 150a, 150b and 150c (shown in phantom). More specifically, side wall 136a extends between side edge 130 and a folded edge 138; side wall 136b extends between side edge 130 and a folded edge 140; and side wall 136c extends between side edge 130 and a folded edge 142. A plurality of cutouts 141, 142, 143, 144, 145, 146 are formed in the front panel 110 as shown in FIG. 4. Cutouts 141–146 permit movement of the retaining panel 134 and side wall margins 136 away from the box 12 into the chamber 80 upon assembly of the carton 10 such that the side wall margins 136 extend substantially perpendicularly between the front panel 110 and the retaining panel 134, and the retaining panel 134 is disposed in a substantially parallel-planar relationship with respect to the front panel of the box.

A notch 132 is formed in the top edge 128 of the cell 122 to permit easy access to materials stored inside the cell. Cutouts 141 forms a notch 147 in the side edge 130 of the retaining panel, and cutout 146 further forms a notch 149 in the opposite side edge of the retaining panel 134 between edges 120a and 120b (FIGS. 1A and 2). Notches 147 and 149 further allow for easy insertion and removal of objects into and out of the cell 122. Notch 149 also permits full width dimension of panel 114 for improved crush resistance when the liner is glued into outer box 12. Notches 148, 148a, 148b and 149 are provided to minimize bulge of folding multiple layers of folding carton boards during gluing operations.

As shown in FIG. 4, a plurality of glue lines 150a, 150b, 150c, 150d (referred to collectively as glue lines 150 and shown in phantom) are provided on the outer surface of the liner 14 to seal the liner 14 to the inner surface of the box 12. As discussed above, integral cell 112 erects automatically when glue lines 150 are properly applied on the liner blank 18 and the carton 10 is formed. The back panel 112 of the liner 14 preferably is not glued to the back panel 22 of the box 12.

The liner 14 also includes a first side flap 152 that extends from a side edge 154 of the front panel 110 defined by score line 156 and a second side flap 158 that extends from a side edge 160 of the back panel 112 defined by score line 162. Upon assembly of the carton, the first side flap 152 is sealed to the second side flap 158 to define a sidewall panel.

Notches 164 and 166 also are cut out of the blank 18 at score lines 156 and 118, respectively, to assist in folding and assembly of the liner 14. It will be appreciated that the locations of score lines 118, 156, and 162 of liner blank 18 correspond to the locations of score lines 32, 40, 54 of box blank 16 to assist in formation of the carton 10.

The liner 14 further includes a top panel 164 that extends from a top edge 166 of the back panel 112 defined by score line 168. When the carton 10 is assembled, the top panel 164 is folded inwardly into the chamber 80, and then the top side flaps 98, 100 are folded on top of the top panel 164 of the liner 14. The top panel 60 of the box 112 then is folded along score line 66 such that the top panel 60 is positioned on the top panel 164 of the liner 14, and the lip margin 62 of the box 12 is disposed inside the recess between the back panels 22, 112 of the box 12 and liner 14 (see FIG. 2). A notch 170 is formed in an outer edge 172 of the top panel 164 to assist a customer in opening the top panel 164 to access the contents in the chamber 80. The top panel 164 increases the overall strength of the carton 10.

Figure 5:
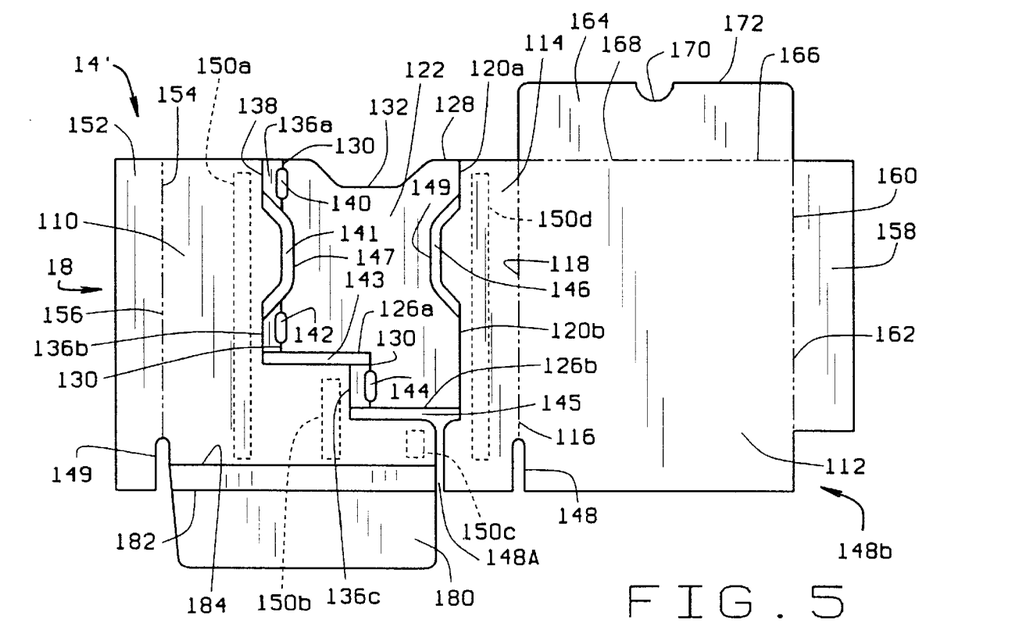
FIG. 5 is a plan view of a blank for a second embodiment of a liner that can be glued to an inner surface of the box shown in FIG. 3.

FIG. 5 shows an alternative embodiment of a liner 14' that can be used in conjunction with the box 12. The liner 14' differs from the liner 14 set forth above and shown in FIG. 4 in that a bottom panel 180 is joined to the front panel 110 along a bottom fold edge 182. The bottom panel 180 is folded inwardly at fold edge 184 into the chamber 80 upon assembly of the carton 10. In this configuration, the bottom panel 180 provides increased strength and durability for the carton 10. When the carton 10 is erected, the bottom panel 180 folds horizontally on score 182 so that the bottom panel 180 is seated against the bottom panel 68 of the outer box 12. Folded edge 182 is set-back into the carton to minimize bulge of the folded board thicknesses during gluing operations. As discussed above with respect to liner 14, notches 148, 148a, 148b and 149 also are provided to minimize bulge of folding multiple layers of folding carton boards during gluing operations.

FIG. 6 shows an alternative embodiment for an outer box 12" that can be used to form the carton 10. The box 12" of FIG. 6 differs from that discussed above and shown in FIG. 3 in that the box 12" includes a bottom panel 190 that is joined to the back panel 22 along the bottom edge 48. A lip margin 192 extends outwardly from a folded edge 194 of the bottom panel 190 that is defined by a score line 196 in the blank. A pair of bottom side flaps 197, 198 also are provided, with one bottom side flap 197 being joined to sidewall panel 24 along its bottom edge 90, and the other bottom side flap 198 being joined to sidewall panel 56 along its bottom edge 92. Upon assembly of the box 12", the bottom side flaps 197, 198 are folded inwardly into the chamber 80 along the score lines 94, 96, respectively. The bottom panel 190 then is folded upwardly along the score line 50 to define the bottom of the box 14. The lip margin 192 is folded along score line 196 so that the lip margin 14" is disposed in a substantially perpendicular relationship with respect to the bottom panel 190. The lip margin 192 is maintained inside the chamber 80 in engagement with the inner surface of the front panel 20 to hold the bottom panel 190 in position. In this configuration, score line 44 also is not included in the box 12" since bottom margins 68a and 68b are not employed.

Figure 7:
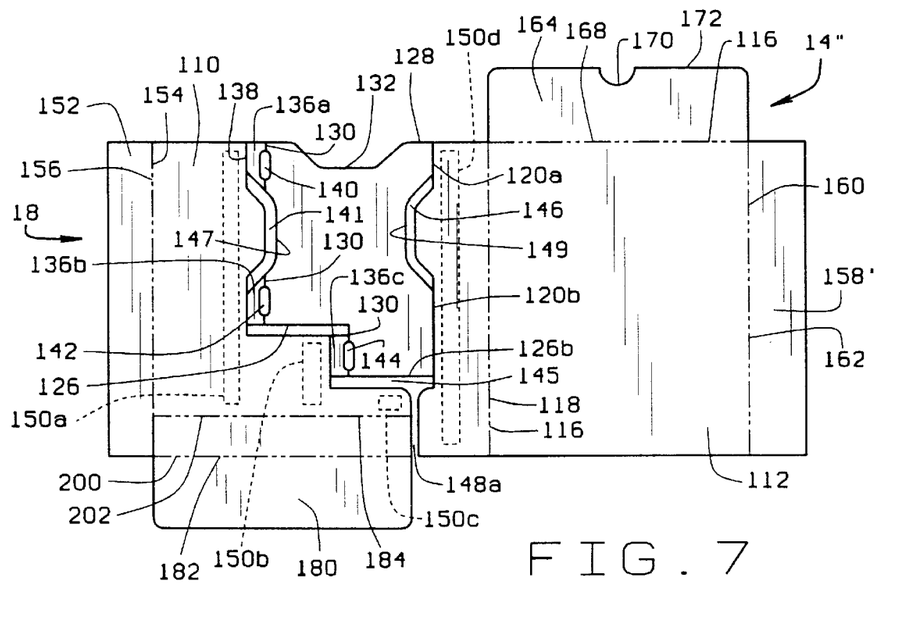
FIG. 7 is a plan view of a blank for a liner that can be glued to an inner surface of the box shown in FIG. 6.

FIG. 7 illustrates the preferred construction for a liner 14" used in conjunction with the box 12" of FIG. 6. The liner 14" of FIG. 7 generally includes the front panel 110, back panel 112, side panels 114, 152, top panel 164 and cell 122 as also shown in FIGS. 4 and 5. However, the liner 14" does not include the notches 148 and 149 at score lines 118 and 156, or notch 148b, as required in liner 14 and 14'. As discussed above, notches 148, 148a, 148b and 149 are provided in liners 14 and 14' to minimize bulge of folding multiple layers of folding carton boards during gluing operations. With notch 148b eliminated in this configuration, side flap 158' that is joined to the side edge 160 of the back panel 112 extends substantially the entire length of the back panel 112, whereas the side flap 158 of liners 14 and 14' extend less than the entire length of the back panel 112 to accommodate notch 148b (compare FIG. 7 to FIGS. 4 and 5). Furthermore, folded edges 182 and 184 are defined by score lines 200, 202, respectively, in the liner 14" of FIG. 7.

In view of the above, it will be seen that the several objects and advantages of the present invention have been achieved and other advantageous results have been obtained.

The foregoing description is set forth only for illustrative purposes only and is not meant to be limiting. As various changes could be made in the above constructions without departing from the scope of the invention, it is intended that all matter contained in the above description or shown in the accompanying drawings shall be interpreted as illustrative and not in a limiting sense. For example, the dimensions of the cell and orientation of the cutouts can be varied to obtain cells of varying shapes and sizes to accommodate various objects, depending upon the particular use for the carton. Additional glue lines can be added to further secure the liner to the box. Various dimensions of the box and liner can be increased or decreased to accommodate materials of varying sizes and quantities. Numerous other variations, within the scope of the appended claims will be apparent to those skilled in the art in light of the foregoing description and accompanying drawings.

We claim:

1. A storage carton erected from a blank and having an integral cell for holding an item comprising:
   a box including a front panel and a back panel joined by perpendicularly extending side panels, and having a top panel, a bottom panel extending between the top, back and side panels to define a bottom of the box, and said top panel extending between the front, back and side panels to define a top of the box, said front, back, side, top and bottom panels defining a chamber therebetween; and
   a liner disposed in the chamber of the box, said liner having a liner front panel and a liner back panel joined by perpendicularly extending liner side panels, said liner front, back and side panels having dimensions substantially similar to those of the front, back and side panels of the box, respectively, said liner further including a plurality of cutouts in the liner front panel that define a retaining panel and side walls, said cutouts allowing the retaining panel to move inwardly into the chamber during of the carton, said side walls extending substantially perpendicularly between the front panel of said liner and the retaining panel said retaining panel, side walls and box defining a cell in which an object can be inserted, said cell being open along a top edge to allow an object to be easily inserted therein.

2. The storage carton as set forth in claim 1 wherein said cell is adapted to receive a computer disc therein.

3. The storage carton as set forth in claim 1 wherein said cell is adapted to receive an audio cassette therein.

4. The storage carton as set forth in claim 1 wherein said cell is adapted to receive a video cassette therein.

5. The storage carton as set forth in claim 1 wherein said box and said liner are formed from paperboard.

6. The storage carton as set forth in claim 1 wherein said box and said liner are formed from E-flute material.

7. The storage carton as set forth in claim 1 wherein said box and said liner are formed from F-flute material.

8. The storage carton as set forth in claim 1 wherein said box and said liner are formed from a paperboard composite material.

9. The storage carton as set forth in claim 1 wherein said liner is glued to an inner surface of said box at a plurality of predetermined locations so that the cell is formed upon assembly of the carton.

10. The storage carton as set forth in claim 1 wherein said cell includes a notch formed in the top edge to facilitate removal of an object stored in the cell.

11. The storage carton as set forth in claim 1 wherein said box is formed from a blank, the blank including a plurality of score lines, said score lines including a first pair of parallel score lines separating said front panel from each of the sidewall panels, a second pair of parallel score lines separating said back panel from each of the sidewall panels, another score line separating said top panel from said front panel, and at least one score line separating said bottom panel from said back panel.

12. The storage carton as set forth in claim 11 wherein said liner is formed from a blank, said blank including a plurality of score lines, said score lines including a pair of score lines separating said back panel from each of said sidewall panels, and a score line separating said front panel from one of the sidewall panels, said blank further including a plurality of cutouts formed in the front panel and the other sidewall panel, said cutouts allowing for inward movement of the cell into the chamber upon assembly of the carton.

13. A blank for a carton liner for use in a carton comprising:
   a front panel;
   a back panel;
   a first sidewall panel connected to said front panel and said back panel along opposite side edges thereof defined by substantially parallel vertical score lines;
   a first sidewall flap connected to said front panel along a side edge thereof defined by a vertical score line;
   a second sidewall flap connected to said back panel along a side edge thereof defined by a vertical score line, said first sidewall flap being sealed to said second side wall flap upon assembly of the carton to define a second sidewall panel;
   a top support panel connected to said back panel along a top edge thereof defined by a horizontal score line;
   a plurality of cutouts formed in said front panel and said first sidewall panel to define a retaining panel and a plurality of sidewalls, said cutouts permitting inward movement of said retaining panel upon assembly of said carton so that said sidewalls extend substantially perpendicularly between said front panel and said retaining panel.

14. The carton liner blank as set forth in claim 13 further including a bottom support panel connected to said front panel along a bottom edge thereof defined by a horizontal score line.

15. The carton liner blank as set forth in claim 13 wherein said liner is glued to a blank for forming the carton.

16. A carton liner blank as set forth in claim 15 wherein said blank for said carton includes a front panel, said front panel of said liner being glued to said front panel of said carton at predetermined locations, said carton having a back panel, a first side wall panel connected to said carton front panel, and said carton back panel along opposite side edges thereof defined by substantially parallel vertical score lines, a second wall panel connected to said carton front panel along a side edge thereof defined by a vertical score line, a glue flap connected to said carton back panel along a side edge thereof defined by a vertical score line, said second side wall panel being sealed to said glue flap upon assembly of the carton, a top panel associated with said carton front panel along a top edge thereof defined by a horizontal score line, and a bottom panel connected to said carton back panel along a bottom edge thereof defined by a horizontal score line.

* * * * *

UNITED STATES PATENT AND TRADEMARK OFFICE
CERTIFICATE OF CORRECTION

PATENT NO. : 5,944,183
DATED : August 31, 1999
INVENTOR(S) : Rowland, Angela L., and
Fielder, Larry D.

It is certified that error appears in the above-indentified patent and that said Letters Patent is hereby corrected as shown below:

Column 7, claim 1, line 52, after "during" and before "of"

insert ---assembly---.

Signed and Sealed this

Eighteenth Day of April, 2000

Attest:

Q. TODD DICKINSON

Attesting Officer

Director of Patents and Trademarks